United States Patent
Zhang et al.

(10) Patent No.: US 11,094,044 B2
(45) Date of Patent: Aug. 17, 2021

(54) METHOD AND IMAGE PROCESSING DEVICE FOR IMAGE COLOR ENHANCEMENT

(71) Applicant: Novatek Microelectronics Corp., Hsinchu (TW)

(72) Inventors: Lei Zhang, Shaanxi Province (CN); Yongchao Li, Xi'an (CN); JianHua Liang, ShaanXi Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 92 days.

(21) Appl. No.: 16/660,735

(22) Filed: Oct. 22, 2019

(65) Prior Publication Data

US 2021/0118105 A1 Apr. 22, 2021

(51) Int. Cl.
*G06T 5/00* (2006.01)
*G06T 7/90* (2017.01)

(52) U.S. Cl.
CPC ............ *G06T 5/009* (2013.01); *G06T 7/90* (2017.01); *G06T 2207/10024* (2013.01); *G06T 2207/20172* (2013.01)

(58) Field of Classification Search
CPC . G06T 5/009; G06T 7/90; G06T 2207/10024; G06T 2207/20172
See application file for complete search history.

(56) References Cited

U.S. PATENT DOCUMENTS

| | | | | |
|---|---|---|---|---|
| 6,823,083 B1* | 11/2004 | Watanabe | ............ | H04N 1/6005 348/E9.053 |
| 2004/0041951 A1* | 3/2004 | Kim | .................. | H04N 9/68 348/703 |
| 2007/0109317 A1* | 5/2007 | Minakuchi | ............... | H04N 9/68 345/604 |
| 2010/0060670 A1* | 3/2010 | Kuo | .................. | G09G 5/02 345/690 |
| 2010/0165193 A1* | 7/2010 | Kanai | ................ | H04N 21/4318 348/453 |
| 2013/0071026 A1* | 3/2013 | Roux | .................. | G09G 5/02 382/167 |
| 2017/0358063 A1* | 12/2017 | Chen | .................... | H04N 1/6019 |

* cited by examiner

*Primary Examiner* — Phuoc Tran
(74) *Attorney, Agent, or Firm* — JCIPRNET

(57) ABSTRACT

A method and an image processing device for image color enhancement are proposed. The method includes the following steps. An input image having input pixels is received, where each of the input pixels includes a luminance component and two chrominance components. A saturation gain of each of the input pixels is determined according to the chrominance components thereof. The chrominance components of each of the input pixels are adjusted according to the saturation gain thereof so as to generate enhanced pixels. An enhanced image is outputted according to the enhanced pixels.

14 Claims, 3 Drawing Sheets

METHOD AND IMAGE PROCESSING DEVICE FOR IMAGE COLOR ENHANCEMENT

TECHNICAL FIELD

The disclosure relates to a method and an image processing device for image color enhancement.

BACKGROUND

With rapidly advancing computer, network, and digital imaging technologies, there is an astronomical amount of image data for a wide range of applications, especially in video equipment and displays. Color enhancement is one of common processing tasks performed on digital video data. In typical color enhancement schemes, artifacts including image clipping, boosted noise, and overly-dark color may occur in certain regions.

SUMMARY OF THE DISCLOSURE

A method and an image processing device for image color enhancement are proposed.

According to one of the exemplary embodiments, the method includes the following steps. An input image having input pixels is received, where each of the input pixels includes a luminance component and two chrominance components. A saturation gain of each of the input pixels is determined according to the chrominance components thereof. The chrominance components of each of the input pixels are adjusted according to the saturation gain thereof so as to generate enhanced pixels. An enhanced image is outputted according to the enhanced pixels.

According to one of the exemplary embodiments, the image processing device includes a memory circuit and a processing circuit. The memory circuit is configured to store data. The processing circuit is configured to receive an input image having input pixels that includes a luminance component and two chrominance components, determine a saturation gain of each of the input pixels according to the chrominance components thereof, adjust the chrominance components of each of the input pixels according to the saturation gain thereof so as to generate enhanced pixels, and output an enhanced image according to the enhanced pixels.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
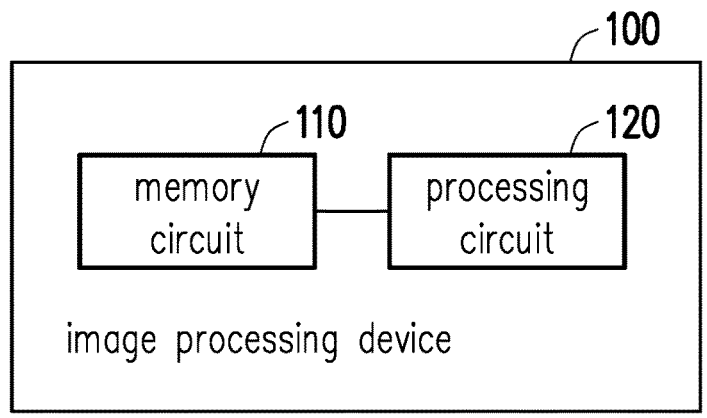
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 would include a memory circuit 110 and a processing circuit 120 coupled thereto in the present exemplary embodiment. The image processing device 100 may be implemented as an integrated circuit (IC) or a computer system. The memory circuit 110 would be configured to store programming codes, device configurations, data, and so forth and may be implemented using any memory technology. The processing circuit 120 would be configured to implement functional elements of the proposed method in the following exemplary embodiments.

Figure 2:
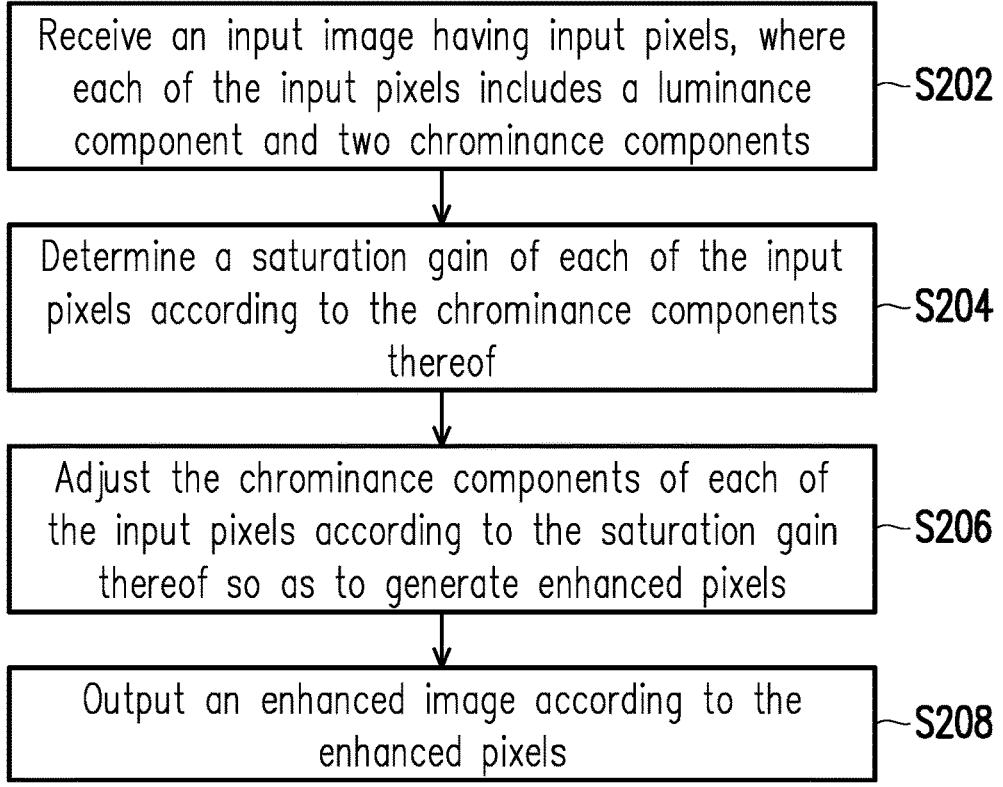
FIG. 2 illustrates a flowchart of a proposed method for image color enhancement in accordance with one of the exemplary embodiments of the disclosure.

FIG. 2 illustrates a flowchart of a proposed method for image color enhancement in accordance with one of the exemplary embodiments of the disclosure. The steps of FIG. 2 could be implemented by the proposed image processing device 100 as illustrated in FIG. 1.

Referring to FIG. 2 in conjunction to FIG. 1, the processing circuit 120 of the image processing device 100 would receive an input image having input pixels, where each of the input pixels would include a luminance component and two chrominance components (Step S202). Herein, the input image to be processed would be an image in a luminance-chrominance color space such as a YUV color space in which brightness information and color information are separated. It should be noted that, if an image originally received by the processing circuit 120 (referred to as "an original image") is in a first color space (e.g. RGB color space) different from the luminance-chrominance color space, the processing circuit 120 would first convert the original image from first color space to the luminance-chrominance color space and set the converted original image as the input image to be processed. The color space conversion may be performed with well-known equations. For example, image data in the RGB color space may be converted to the YUV color space by using a set of linear equations.

Since the brightness information and the color information are separated, the processing circuit 120 would only process the chrominance components to ensure that the brightness remains consistent before and after color enhancement and the image noise is not boosted. Specifically, overly-dark color, which is a main problematic issue in HSV color space approaches, would be avoided in certain regions. Herein, the processing circuit 120 would determine a saturation gain of each of the input pixels according to the chrominance components thereof (Step S204) and adjust the chrominance components of each of the input pixels according to the saturation gain thereof so as to generate enhanced pixels (Step S206). The saturation of each of the pixel may be computed based on its chrominance components as known per se. The pixel with a low saturation value would have a high saturation gain and vice versa. By doing so, image clipping would be avoided in high saturation regions.

Next, the processing circuit 120 would output an enhanced image according to the enhanced pixels (Step S208). Herein, the enhanced pixels would be in the luminance-chrominance color space. If the image originally received by the processing circuit 120 is already in the luminance-chrominance color space, the enhanced image would be an image that is formed by the enhanced pixels. On the other hand, if the image originally received by the processing circuit 120 is in the first color space as previously mentioned, the processing circuit 120 would convert the enhanced pixels from the luminance-chrominance color back to the first color space to generate the enhanced image.

Figure 3:
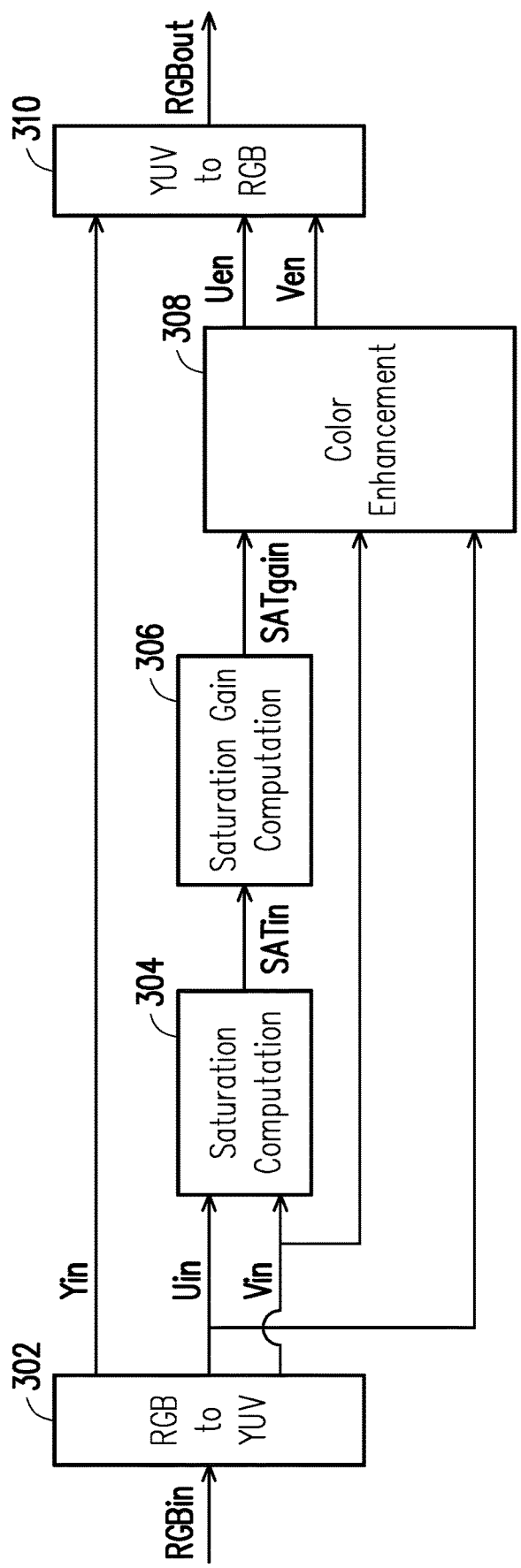
FIG. 3 illustrates a functional flowchart of a proposed method for image color enhancement in accordance with another one of the exemplary embodiments of the disclosure.

For better comprehension, FIG. 3 illustrates a functional flowchart of a proposed method for image color enhancement in accordance with another one of the exemplary embodiments of the disclosure.

Referring to FIG. 3 in conjunction to FIG. 1, the processing circuit 120 would first receive an image in the RGB color space and perform an RGB to YUV conversion 302 on the image. For brevity purposes, only one pixel among all pixels in the image would be illustrated, and the other pixels may be deduced in a similar fashion. Herein, a pixel RGBin would be converted to a pixel with a luminance component Yin as well as chrominance components Uin and Vin. As a side note, the converted pixel would be considered as "an input pixel" in the luminance-chrominance color space.

Next, the processing circuit 120 would perform saturation computation 304 based on the chrominance components Uin and Vin to determine a saturation of the input pixel SATin (referred to as "an input saturation" hereafter). The input saturation SATin of the input pixel may be estimated as the square root of the sum of squares of the two chrominance components represented as Eq. (1):

$$SATin = \sqrt{Uin^2 + Vin^2} \qquad \text{Eq. (1)}$$

Next, the processing circuit 120 would perform saturation gain computation 306 to determine a saturation gain of the input pixel SATgain. The input pixel with a low input saturation would have a high saturation gain and vice versa. The saturation gain computation 306 may be performed in various approaches.

Figure 4:
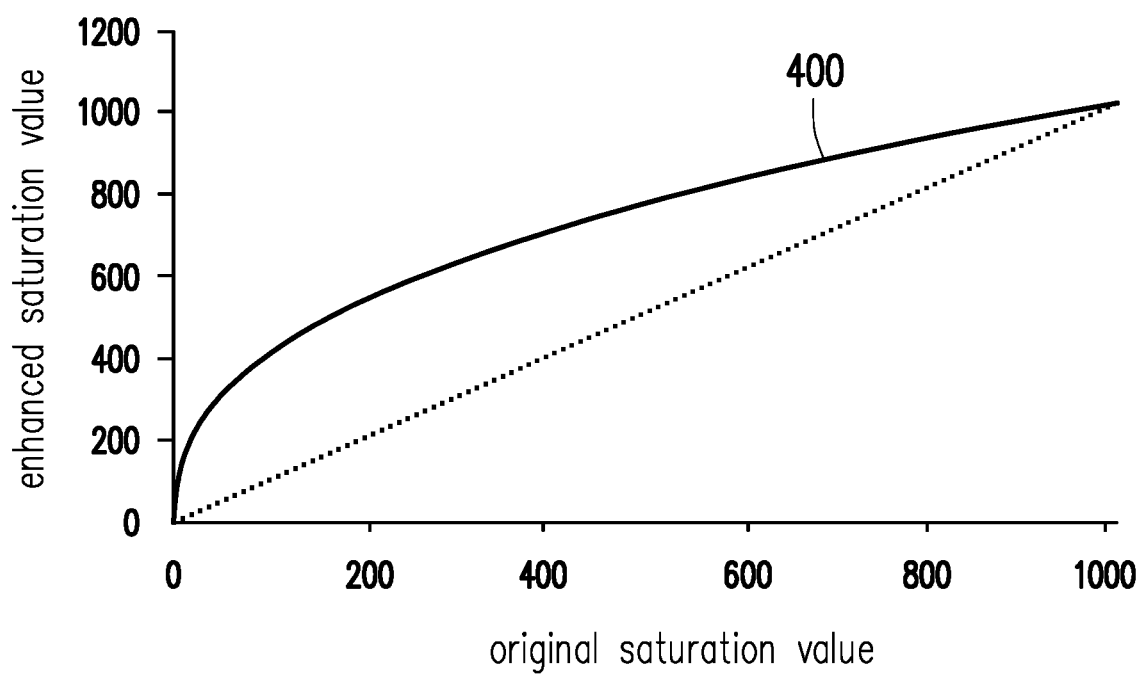
FIG. 4 illustrates a curve of a saturation enhancement function in accordance with one of the exemplary embodiments of the disclosure.

In one exemplary embodiment, the processing circuit 120 may first determine a target saturation of the input pixel according to the input saturation SATin and a saturation enhancement function. The saturation enhancement function describes a relationship between original saturation values and enhanced saturation values, where the smaller the original saturation value, the larger the increment of the enhanced saturation value. For example, the saturation enhancement function may be a gamma-like curve 400 as illustrated in FIG. 4, where the horizontal axis represents original saturation values and the vertical axis represents enhanced saturation values. The curve points of the curve 400 are also considered as parameters for controlling the saturation gain as well as the color enhancement strength of an image. In another example, the saturation enhancement function may be other polynomials that satisfy the aforesaid relationship between original saturation values and enhanced saturation values. To avoid undergoing expensive computation or input/output operation, the saturation enhancement function may be pre-stored in the memory circuit 110 as a form of a lookup table as known per se. The processing circuit 120 may input the input saturation SATin into the lookup table and obtain the target saturation mapped by the input saturation SATin as the output of the lookup table.

Referring back to FIG. 3, once the target saturation of the input pixel (denote as "SATtar") is determined, the processing circuit 120 may compute its saturation gain SATgain. The processing circuit 120 may first determine whether the input saturation SATin of the input pixel is zero. If the determination is negative, the processing circuit 120 would set the saturation gain SATgain to a ratio of the target saturation and the input saturation SATin. If the determination is affirmative, the processing circuit 120 would set the saturation gain SATgain to one; that is, no saturation gain is applied. The saturation gain SATgain of the input pixel may be represented as Eq. (2):

$$SATgain = \begin{cases} \dfrac{SATtar}{SATin} & sat \neq 0 \\ 1 & sat = 0 \end{cases} \qquad \text{Eq. (2)}$$

In another exemplary embodiment, since the aforesaid lookup table corresponding to the saturation enhancement function and Eq. (2) both are one-to-one functions and may be implemented as an integrated lookup table representing a saturation-gain relationship, where the saturation-gain relationship describes a direct relationship between original saturation values and saturation gains. Such integrated lookup table may be pre-stored in the memory circuit 110, and the processing circuit 120 may input the input saturation SATin into the integrated lookup table and obtain the SATgain mapped by the input saturation SATin as the output of the integrated lookup table.

Once the saturation gain SATgain of the input pixel is determined, the processing circuit 120 would perform color enhancement 308 on the input pixel by applying the saturation gain SATgain on the chrominance components to generated the adjusted chrominance components Uen and Ven based on, for example, Eq. (3):

$$\begin{cases} Uen = Uin \times SATgain \\ Ven = Vin \times SATgain \end{cases} \qquad \text{Eq. (3)}$$

The processing circuit 120 would combine the luminance component Yin and the adjusted chrominance components Uen and Ven of the input pixel to generate an enhanced pixel. In the present exemplary embedment, the processing circuit 120 would perform a YUV to RGB conversion 310 on the enhanced pixel to generate a pixel RGBout as final output.

In view of the aforementioned descriptions, the proposed method and image processing device provide an image color enhancement scheme without introducing other artifacts.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for image color enhancement comprising:
    receiving an input image having a plurality of input pixels, wherein each of the input pixels includes a luminance component and two chrominance components;
    determining a saturation gain of each of the input pixels according to the chrominance components thereof;
    computing an input saturation of each of the input pixel according to the chrominance components thereof;
    determining a target saturation of each of the input pixel according to the input saturation thereof and a saturation enhancement function, wherein the saturation enhancement function describes a relationship between original saturation values and enhanced saturation values, wherein the smaller the original saturation value, the larger the increment of the enhanced saturation value;
    computing the saturation gain of each of the input pixels according to the input saturation and the target saturation thereof;
    adjusting the chrominance components of each of the input pixels according to the saturation gain thereof so as to generate enhanced pixels; and
    outputting an enhanced image according to the enhanced pixels.

2. The method according to claim 1, wherein the step of computing the saturation gain of each of the input pixels according to the input saturation and the target saturation thereof comprising:
    for each of the input pixels:
        determining whether the input saturation of the input pixel is zero;
        if the determination is negative, setting the saturation gain to a ratio of the target saturation and the input saturation; and
        if the determination is affirmative, setting the saturation gain to one.

3. The method according to claim 1, wherein the saturation enhancement function is a form of a lookup table.

4. The method according to claim 1, wherein the step of adjusting the chrominance components of each of the input pixels according to the saturation gain thereof comprises:
    for each of the input pixels:
        adjusting the chrominance components by applying the saturation gain on each of the chrominance components.

5. The method according to claim 1, wherein the step of generating the enhanced pixels comprises:
    combining the luminance component and the adjusted chrominance components of each of the input pixels to generate the enhanced pixels.

6. The method according to claim 1, wherein before the step of receiving the input image, the method further comprises:
    receiving an original image in a first color space; and
    converting the original image from the first color space to a luminance-chrominance color space to generate the input image.

7. The method according to claim 6, wherein the step of outputting the enhanced image according to the enhanced pixels comprises:
    converting the enhanced pixels from the luminance-chrominance color space to the first color space to generate the enhanced image.

8. An image processing device comprising:
    a memory circuit, configured to store data;
    a processing circuit, configured to:
        receive an input image having a plurality of input pixels, wherein each of the input pixels includes a luminance component and two chrominance components;
        determine a saturation gain of each of the input pixels according to the chrominance components thereof;
        compute an input saturation of each of the input pixel according to the chrominance components thereof;
        determine a target saturation of each of the input pixel according to the input saturation thereof and a saturation enhancement function, wherein the saturation enhancement function describes a relationship between original saturation values and enhanced saturation values, wherein the smaller the original saturation value, the larger the increment of the enhanced saturation value;
        compute the saturation gain of each of the input pixels according to the input saturation and the target saturation thereof;
        adjust the chrominance components of each of the input pixels according to the saturation gain thereof so as to generate enhanced pixels; and
        output an enhanced image according to the enhanced pixels.

9. The image processing device according to claim 8, wherein for each of the input pixels, the processing circuit is configured to determine whether the input saturation of the input pixel is zero, set the saturation gain to a ratio of the target saturation and the input saturation if the determination is negative, and set the saturation gain to one if the determination is affirmative.

10. The image processing device according to claim 8, wherein the memory circuit is configured to store the saturation enhancement function in a form of a lookup table.

11. The image processing device according to claim 8, wherein for each of the input pixels, the processing circuit is configured to adjust chrominance components by applying the saturation gain on each of the chrominance components.

12. The image processing device according to claim 8, wherein the processing circuit is configured to combine the luminance component and the adjusted chrominance components of each of the input pixels to generate the enhanced pixels.

13. The image processing device according to claim 8, wherein the processing circuit is further configured to receive an original image in a first color space and convert the original image from the first color space to a luminance-chrominance color space to generate the input image.

14. The image processing device according to claim 13, wherein the processing circuit is configured to perform color space conversion on the enhanced pixels to generate the enhanced image in the first color space.

* * * * *